US007784715B2

(12) United States Patent
Kress

(10) Patent No.: US 7,784,715 B2
(45) Date of Patent: Aug. 31, 2010

(54) CARTRIDGE AND ADMIXING APPARATUS FOR A MANUALLY OPERABLE APPARATUS FOR SPRAYING WATER MIXED WITH AN ADDITIVE

(75) Inventor: Werner Kress, Ulm (DE)

(73) Assignee: Brill Gloria Haus-Und Gartengerate GmbH, Witten (DE)

( * ) Notice: Subject to any disclaimer, the term of this patent is extended or adjusted under 35 U.S.C. 154(b) by 157 days.

(21) Appl. No.: 12/024,533

(22) Filed: Feb. 1, 2008

(65) Prior Publication Data

US 2008/0178940 A1 Jul. 31, 2008

Related U.S. Application Data

(63) Continuation of application No. PCT/EP2006/007414, filed on Jul. 27, 2006.

(60) Provisional application No. 60/728,455, filed on Oct. 20, 2005.

(30) Foreign Application Priority Data

Aug. 1, 2005 (DE) .................. 10 2005 036 046

(51) Int. Cl.
B05B 7/32 (2006.01)
B05B 7/28 (2006.01)
B05B 7/26 (2006.01)
B05B 9/04 (2006.01)

(52) U.S. Cl. ................. 239/310; 239/373; 137/564.5

(58) Field of Classification Search ............... 239/302, 239/310, 315–318, 340, 373, 375, 398, 433, 239/434, 525, 526; 137/101.11, 564.5
See application file for complete search history.

(56) References Cited

U.S. PATENT DOCUMENTS

| 1,827,502 | A | | 10/1931 | Alland |
| 2,153,240 | A | * | 4/1939 | Dailey et al. ............. 137/553 |
| 2,584,104 | A | | 2/1952 | Aske ..................... 299/83 |
| 2,857,202 | A | | 10/1958 | Snyder .................... 299/84 |
| 3,095,892 | A | | 7/1963 | Laing et al. ............ 137/101.11 |
| 3,198,438 | A | * | 8/1965 | Hultgren et al. ........... 239/318 |
| 3,720,230 | A | | 3/1973 | Stockstill ............... 137/564.5 |
| 3,897,004 | A | | 7/1975 | French .................. 239/318 |
| 4,171,070 | A | * | 10/1979 | Colgate et al. ........... 222/133 |
| 4,244,494 | A | * | 1/1981 | Colgate et al. ............. 222/1 |
| 4,406,406 | A | | 9/1983 | Knapp .................. 239/313 |
| 4,418,869 | A | * | 12/1983 | Healy .................. 239/317 |
| 4,545,535 | A | * | 10/1985 | Knapp .................. 239/313 |
| 4,971,105 | A | * | 11/1990 | McGuire .............. 137/564.5 |
| 4,971,248 | A | | 11/1990 | Marino .................. 239/63 |
| 5,094,269 | A | | 3/1992 | Agulia ................ 137/564.5 |
| 6,453,935 | B1 | | 9/2002 | Gilmore ............... 137/268 |

FOREIGN PATENT DOCUMENTS

ES 2154556 4/2001
WO WO02/051555 7/2002

* cited by examiner

*Primary Examiner*—Darren W Gorman
(74) *Attorney, Agent, or Firm*—Taylor IP, P.C.

(57) ABSTRACT

A cartridge for an admixing arrangement of a manually operable arrangement for spraying a solvent, in particular water, into which an additive in the form of a liquid concentrate, such as a plant or crop protection agent, has been mixed, includes an outer cartridge housing; a pressure-sensitive inner container for accommodating the liquid concentrate; a mixing chamber, the mixing chamber having a device with a first outlet opening, for the concentrate or plant spray, an inlet opening, designed as a throttle, for the solvent or water, and a second outlet opening for the concentrate/solvent mixture.

32 Claims, 12 Drawing Sheets

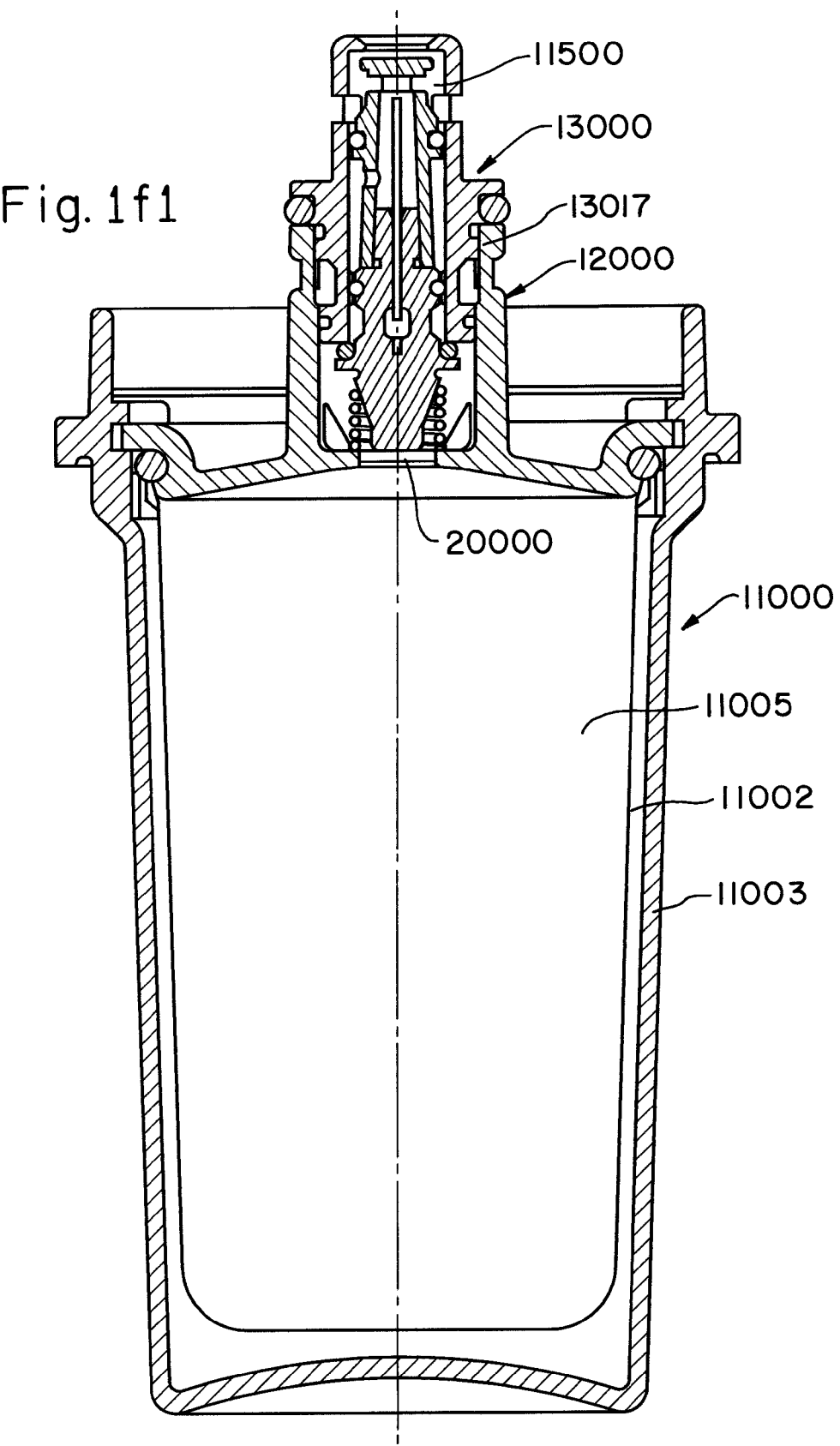
Fig. 1f1

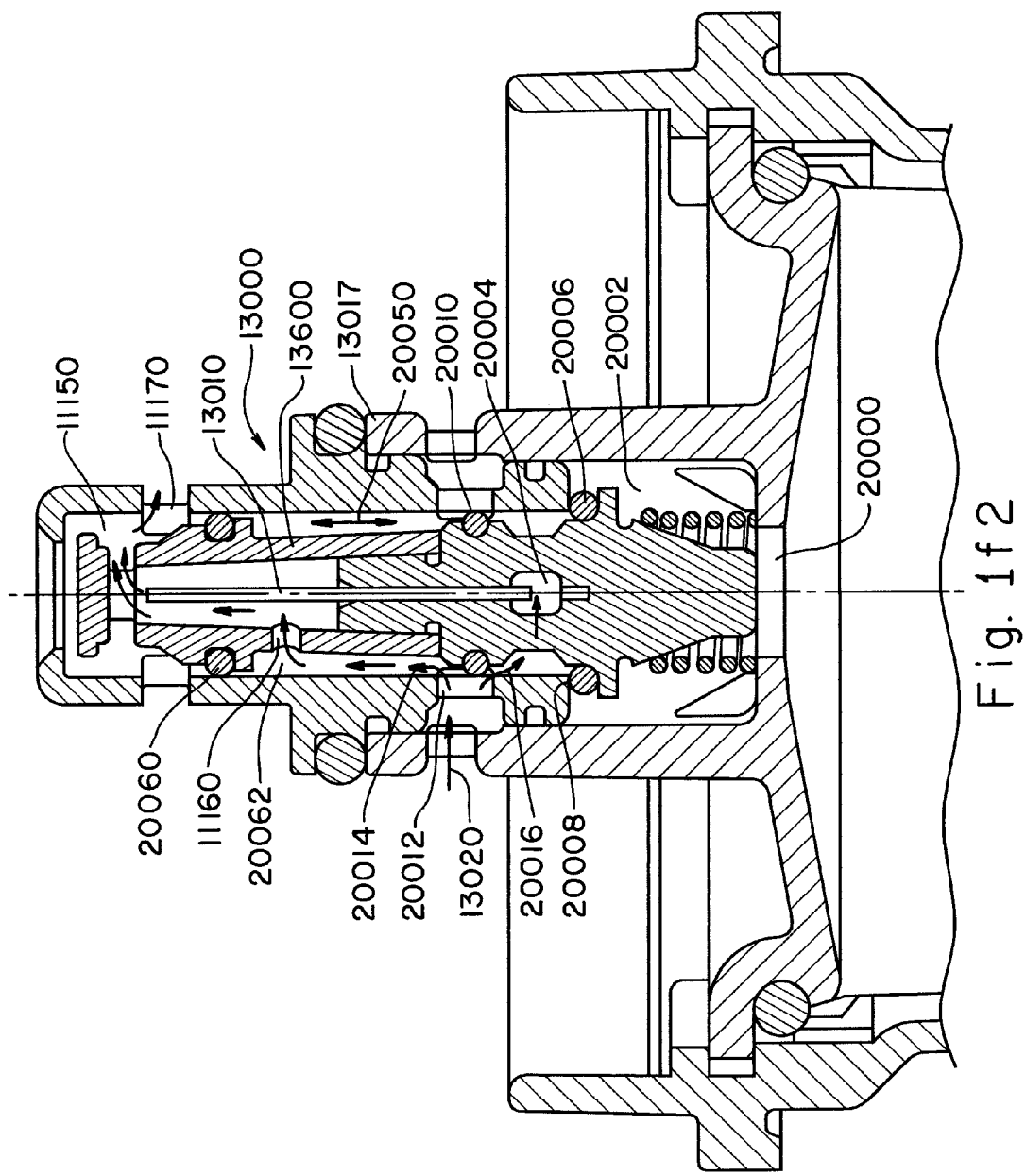

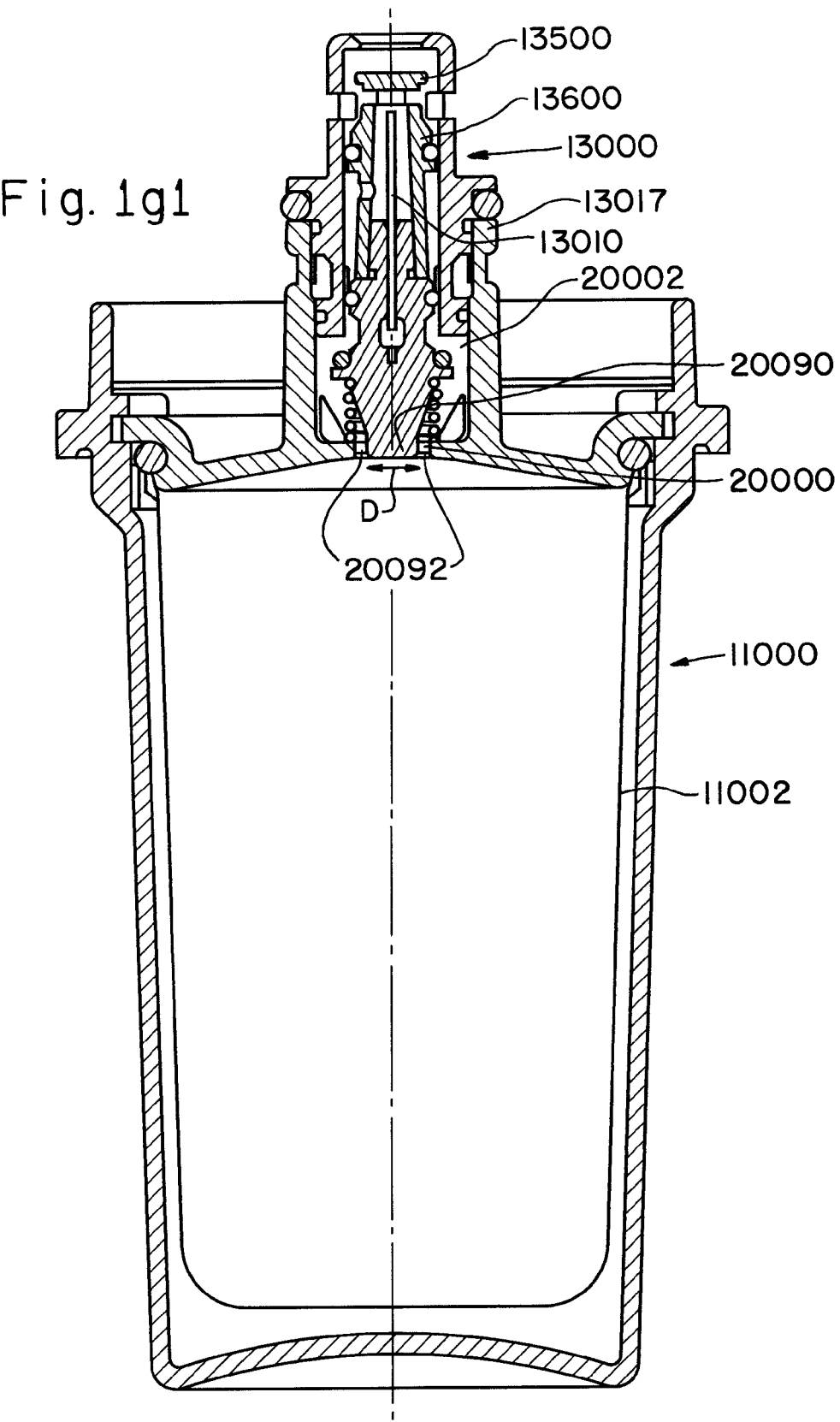
Fig. 1g1

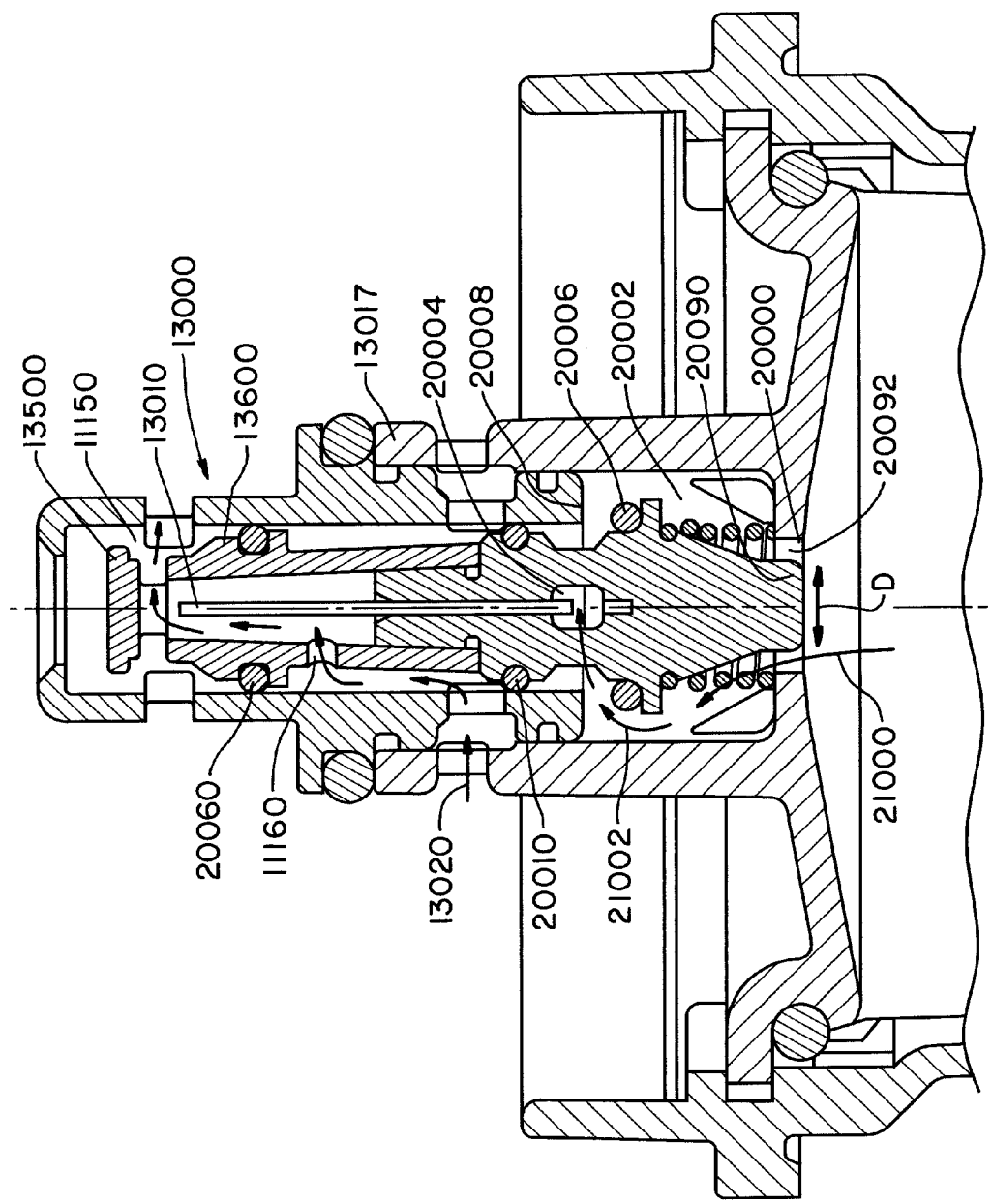

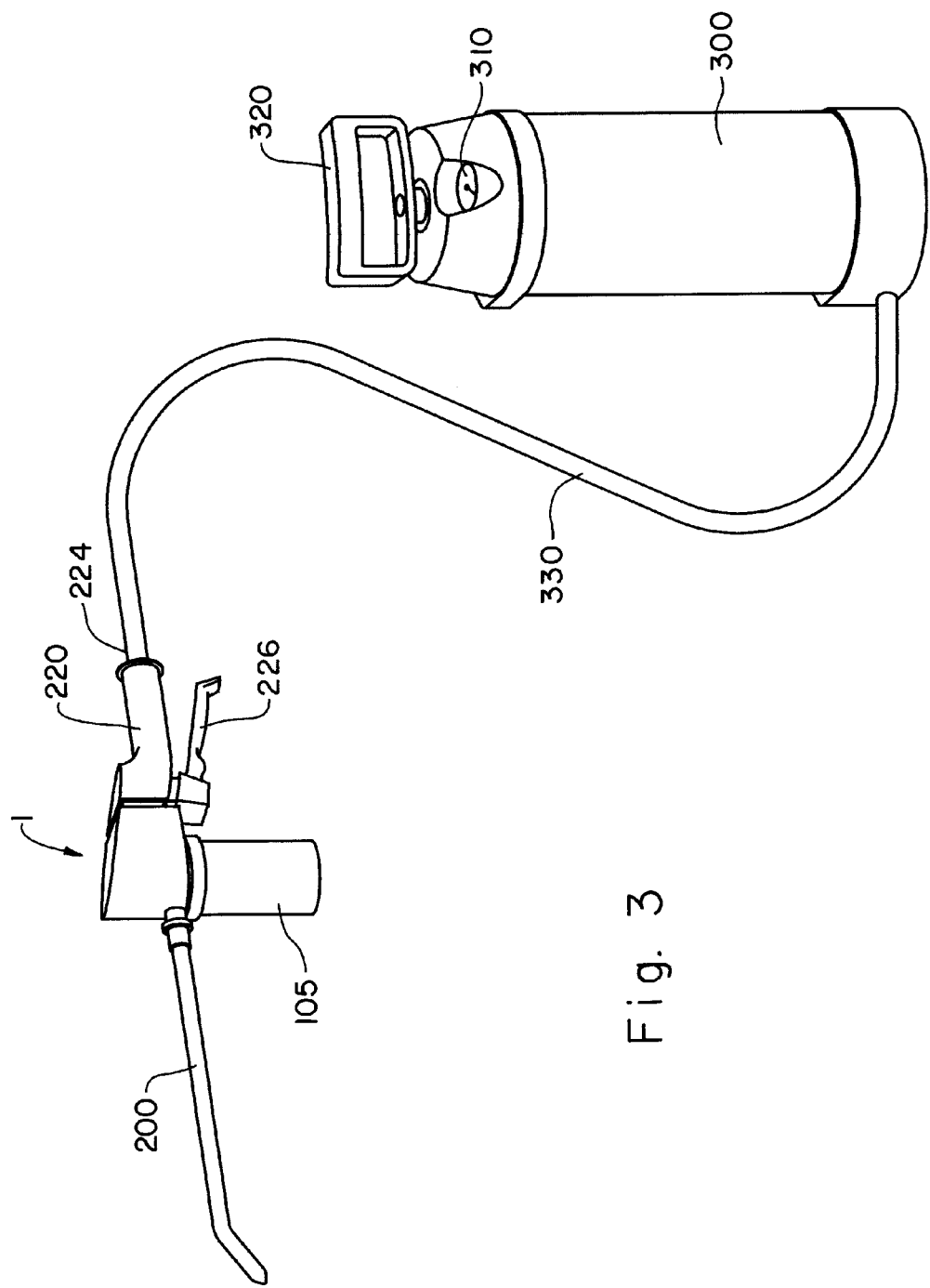

CARTRIDGE AND ADMIXING APPARATUS FOR A MANUALLY OPERABLE APPARATUS FOR SPRAYING WATER MIXED WITH AN ADDITIVE

CROSS REFERENCE TO RELATED APPLICATIONS

This is a continuation of PCT application No. PCT/EP2006/007414, entitled "CARTRIDGE AND ADMIXING ARRANGEMENT FOR A MANUALLY OPERABLE ARRANGEMENT FOR SPRAYING WATER MIXED WITH AN ADDITIVE", filed Jul. 27, 2006, which is incorporated herein by reference and which claims priority to a) German patent application 10 2005 036 046.7, filed on Aug. 1, 2005, which is incorporated herein by reference, and b) U.S. provisional patent application Ser. No. 60/728,455, filed on Oct. 20, 2005, which is incorporated herein by reference.

BACKGROUND OF THE INVENTION

1. Field of the Invention

The invention relates to a cartridge for an admixing apparatus for a manually operable apparatus for spraying water into which an additive in the form of a liquid concentrate, such as a plant protective agent has been mixed. The invention is however not restricted to only admixing of plant protective agents. The output of other chemical substances in concentrated form, for example cleaning agents is also possible with the cartridge.

2. Description of the Related Art

Manually operable devices for spraying of water into which an additive in the form of a liquid concentrate such as a plant protective agent has been mixed are usually utilized with plant protection sprayers and are connected through their water connection which is preferably a pressure connection via a pressure hose with a portable pressure reservoir. Said pressure reservoir accommodates the water which is already mixed with the respective additive and can be pressurized by way of a manually operated or motor driven air pump, causing an air cushion to be formed above the liquid level in the pressure reservoir. The disadvantage of this type of arrangement consists in that the pressure reservoir, the supply hose leading to the spraying device, the manual valve and the spray tube can be contaminated with the additive which is mixed into the water and which may be toxic or at the very least harmful to the environment. An additional disadvantage of this arrangement is that always a large volume of the mixture needs to be prepared which oftentimes is not used up and must subsequently be disposed of. In addition there is an inherent danger with these known spray devices that the additive concentrate in the water is added as an over or under dose, or in other words as an incorrect dose.

In order to overcome the aforementioned problems, a manually operated device for spraying of water whereby an admixing apparatus is utilized has become known from WO 02/051555A1. Said device includes a mixing head onto which a removable cartridge can be mounted which accommodates the concentrate.

The disadvantage of the device known from WO 02/051555A1 is that the cartridge includes a cavity in the form of a cylinder whereby the concentrated additive is moved from the cartridge into the mixing head through the repositioning of a movable piston. On the one hand this is a very expensive arrangement; on the other hand there is the problem that the admixing concentration cannot be altered easily with the mixing chamber being installed permanently in the admixing apparatus.

A fundamentally simpler design compared to the one known from WO 02/051555A1 is the design of manually operable device for spraying of such a mixture as is known for example from U.S. Pat. No. 4,406,406.

In the arrangement which is known from U.S. Pat. No. 4,406,406 the spray medium is discharged through the introduction of a water pressure into a cartridge, either by repositioning of a piston or through compression of a pressure sensitive interior reservoir. A disadvantage of the arrangement known from U.S. Pat. No. 4,406,406 is that the mixing chamber is a component of the mixing head with the same disadvantages that exist and are described in WO 02/051555A1.

A system is known from U.S. Pat. No. 1,827,502 in which a container which contains a chemical is connected with a line which can carry a solvent such as water, in order to admix the chemical into the solvent.

U.S. Pat. No. 2,584,104 illustrates a tank which is connected into a line which carries the solvents, for example water. A chemical is supplied to the flowing solvent or water from the tank and is mixed into the water.

A device for the irrigation of, for example, lawns has become known from U.S. Pat. No. 4,971,248 whereby a reservoir containing for example a chemical, is connected into a line. The chemical is metered through an outlet into a solvent, for example into a stream of water.

U.S. Pat. No. 2,857,202 illustrates an apparatus whereby again a waterline or solvent line is connected to a reservoir which contains chemicals, so that the water from the reservoir may be metered into the solvent when flowing through the line.

U.S. Pat. No. 3,897,004 illustrates a nozzle which is configured such that a fluid can be mixed into a carrier fluid.

What is needed in the art is a cartridge which, compared to the hitherto known cartridges, permits utilization of different concentrates that can always be metered optimally into the water depending for example on the plant additive or concentrate when added into the admixing device.

SUMMARY OF THE INVENTION

The present invention provides that the mixing chamber is not an integral component of the mixing head of the admixing apparatus, but instead is a component of the cartridge that is inserted in the admixing device.

According to the current invention the cartridge itself includes a mixing chamber with a first outlet opening or a so-called nozzle arrangement with nozzle aperture in order to deliver the spray medium and with an inlet opening for water which can be designed as a throttle with a throttle diameter, as well as with a second outlet opening for the mixture which is being produced in the mixing chamber or the cartridge.

It is especially preferable if the first outlet opening or nozzle aperture has a diameter of 0.1 to 3 mm, especially 0.1 to 1 mm, especially preferred 0.1 to 0.5 mm, more especially preferred 0.15 to 0.3 mm and the inlet opening or throttle aperture has a diameter of 1.2 to 3 mm, preferably 1.2 to 2.5 mm, especially 1.4 to 1.9 mm.

The diameter of the nozzle aperture and/or the throttle aperture is selected depending upon the respective spray medium or concentrate which is put into the cartridge, so that the spray medium or concentrate may be optimally discharged. The diameter as well as the nozzle aperture and/or the throttle aperture determine the mixing ratio of the concentrate with the solvent, in this instance with the water. This is due to the fact that different concentrates display different viscosities at the same temperature. The viscosities however, amongst other factors, influence the mixing ratio. Generally speaking, a higher mixing ratio is achieved with increasing temperature with the same concentrate.

In an especially preferred design form the cartridge is connected detachably with the mixing head of the admixing apparatus, for example through a screw connection or a clip connection.

It is especially preferred if the interior reservoir into which the spray medium is put includes a compressible material. Preferred materials are synthetics or rubber-elastic materials. A preferred synthetic material is polyethylene (PE).

The cartridge includes preferably an activator. The activator includes an axially movable component which may preferably be moved into different positions. The advantage of an activator which is configured as a separate component is that it can easily be replaced. Different mixing ratios need to be set, depending upon the concentrate. This is accomplished for example by using different activators for the different concentrates, whereby the activators have different nozzle apertures and/or throttle apertures for the different concentrates. By simply exchanging the activators it is then possible to use one and the same cartridge shape for the different concentrates.

Depending on the design of the activator provision can be made to create an operating condition for said activator whereby concentrate together with the water is delivered, or a flushing condition whereby the mixing chamber and/or the nozzle aperture for the concentrate is rinsed after operation, prior to pulling off the cartridge.

In addition to the inventive cartridge the invention also provides an admixing apparatus for a manually operable arrangement for spraying water into which an additive is mixed, whereby the admixing apparatus is characterized in that the water supply line includes a check valve. This check valve may be designed as a safety valve. In one design variation of the invention where a connection of the inventive admixing apparatus occurs directly to a water connection a so-called non-return flow valve is advantageously provided which serves to prevent water which is contaminated with the additive getting into the water supply line.

In order to ensure a constant pressure before the throttle aperture from the water supply side and in the cartridge which is pressure connected with the water supply side and thereby in the interior reservoir, the admixing apparatus is equipped in a first design variation with a pressure regulator or a pressure limiter. The pressure regulator or pressure limiter is designed so that an operating pressure in the range of 1 bar to 3 bar, preferably 1.2 bar to 2.2 bar exists on the water supply side, irrespective of what the pressure is for example in the pressure reservoir to which the pressure water supply line is connected.

In addition to the cartridge and the water admixing apparatus the invention also provides a manually operated arrangement for spraying water into which an additive is mixed. This arrangement is characterized in that an inventive admixing apparatus with an inventive cartridge is installed between a spray tube and a water supply line, preferably a pressure water supply line.

The water connection is preferably made to the water mains or to a portable pressure reservoir. If a connection to the water mains is provided then the water admixing apparatus with the cartridge may for example be part of a conventional garden hose system as used for example to irrigate the garden.

The water admixing apparatus may for example be installed between the garden hose and a sprinkler unit with which water is delivered.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 1e-g show a third further developed design variation of a cartridge which is to be installed in an admixing apparatus;

FIG. 3 shows one embodiment of a manually operable device for spraying water which is mixed with an additive, whereby a pressure reservoir is provided.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1A:
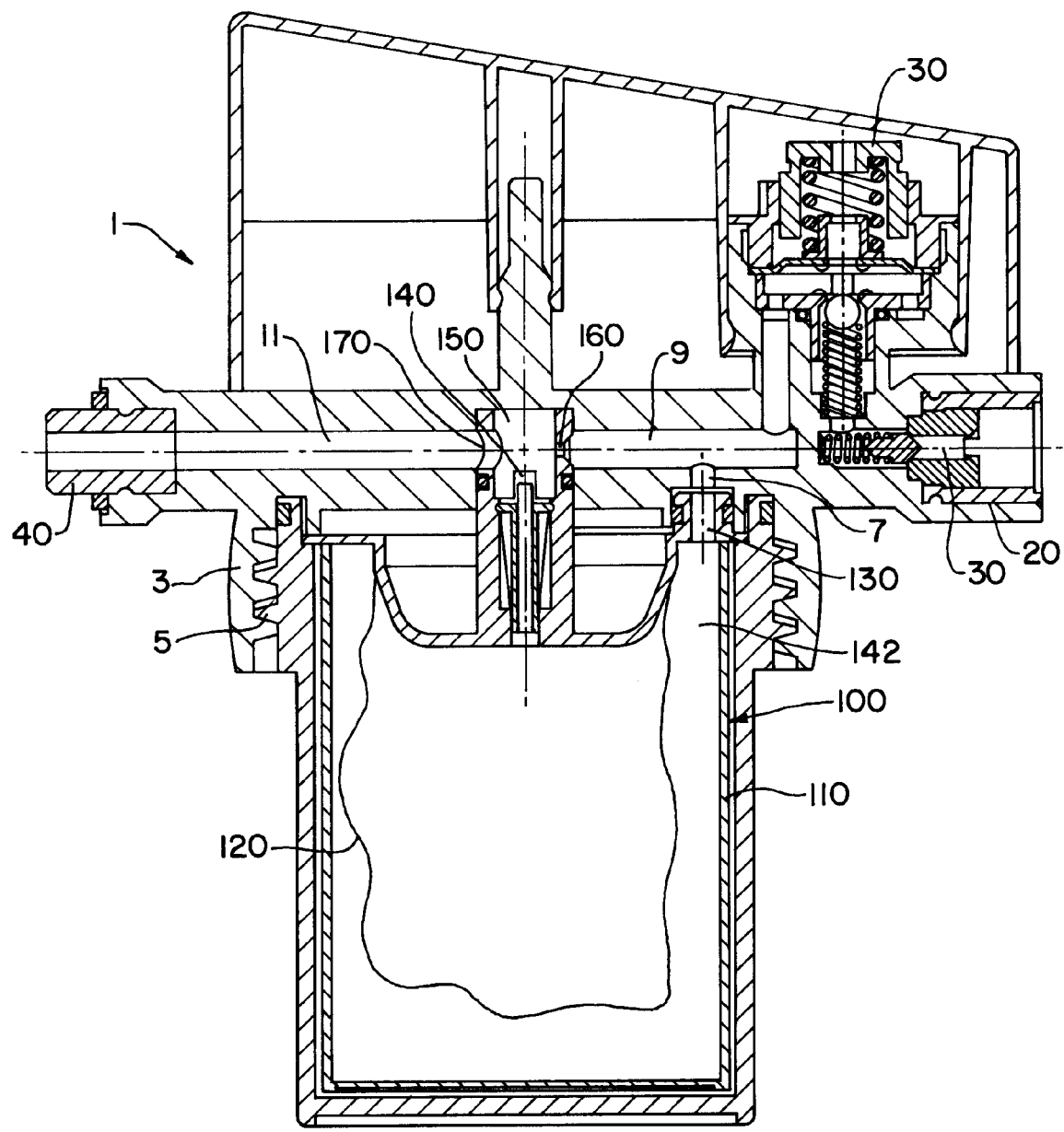
FIG. 1a shows a first design variation of an inventive cartridge which is installed in an admixing apparatus.

Referring now to the drawings, and more particularly to FIG. 1a, there is shown an admixing apparatus 1, which is equipped with a screw thread 3. An exterior container which accommodates the inventive cartridge 100 is connected with the screw thread 3 via a detachable screw connection 5. The cartridge is therefore connected detachably with the admixing apparatus 1. The cartridge 100 includes an outer housing 110 as well as a pressure sensitive interior reservoir 120. The pressure sensitive interior reservoir 120 accommodates the spray medium or additive respectively, or concentrate in its inside. In the illustrated design example the pressure sensitive interior reservoir is constructed from a compressible material. The compressible material of the interior reservoir 120 may for example be a synthetic material or a rubber elastic material. In addition the cartridge has a first inlet 130 which when connecting the cartridge with the admixing apparatus is connected with a water outlet 7 of the admixing apparatus. If water flows for example into the pressure water supply line (which is not illustrated) of the admixing apparatus, then water is supplied through the connection of the water line 7 and the water inlet opening 30 into the space 142 between the interior wall of the outside reservoir 110 as well as the pressure sensitive interior reservoir 120. When water penetrates into the space 142 between the outside housing 110 and the interior reservoir 120, the material of the interior reservoir 120 is compressed until the same pressure prevails on the inside of the interior reservoir as well as in the space 142 between the interior reservoir and the outside reservoir. This serves to deliver the concentrate or the spray medium respectively from the interior reservoir through a nozzle with a nozzle aperture 140 into the mixing chamber 150. The nozzle aperture 140 is also referred to as outlet opening for the concentrate. The mixing chamber 150 is an integral component of the cartridge 100 in contrast to design variations which are known in the current state of the art where the mixing chamber is a component of the admixing apparatus or the mixing head. In the mixing chamber 150 which includes an inlet opening in the form of a throttle, water from the water line 9 of the admixing apparatus is supplied into the mixing chamber 150. By way of the design as a throttle with a throttle aperture 160 a certain pressure gradient is achieved, based on the pressure differential of the throttle; therefore a high pressure exists on the inlet side of the throttle and therefore in the pressure reservoir and a lower pressure on the outlet side of the throttle and therefore in the area of the outlet opening or nozzle aperture 140. Due to the pressure differential between the nozzle aperture 140 and the interior reservoir 120 of the cartridge a certain concentration of spray medium or concentrate respectively is then delivered from the interior reservoir 120. Depending upon the concentrate the throttle aperture may be adjusted, or particularly selected so that an optimum concentration of spray medium or concentrate respectively is delivered through the outlet opening or nozzle aperture 140.

Admixing of the spray medium occurs as described in the mixing chamber through the outlet opening 140.

The nozzle aperture 140 can again be selected according to the used spray medium or concentrate respectively in order to achieve optimum delivery of spray medium into the water in conjunction with the pressure reduction that is determined through the throttle.

It is especially possible to establish the concentration through the selection of the nozzle diameter as well as the throttle diameter with which the spray medium is added to the water. This means that different nozzle apertures and throttle apertures are required for different spray medium, since different spray mediums must be mixed with water at different concentration in order to achieve an optimum effect, for example for spraying of insecticides. Since the mixing chamber is a component of the cartridge, different mixing chambers can be used for different spray mediums or substances respectively which would always be designed to ensure optimum concentrate delivery and optimum blending.

The mixture mixed in the mixing chamber 150 is delivered through an outlet opening 170 into the mixing line 11 of the mixing device 1.

The mixing chamber 150 of the cartridge can be locked with a closure that is not shown here, so that no unintended leakage of spray medium or concentrate respectively from the nozzle aperture can occur. A leak- and child-proof storage of a half full cartridge can be ensured with the assistance of this closure.

The mixing device 1 includes—as previously described—a solvent line, for example a water line 9 as well as a mixture line 11. The mixing chamber 150 is a component of the cartridge 100. The mixing device also includes a check valve 20 in the water supply line 9. A non-return flow valve which is not illustrated here assists in preventing that mixture penetrates into a water supply line which is not illustrated here and which is connected to the mixing device 1, thereby possibly contaminating drinking water if for example it is connected to the house water line.

In order to achieve a constant concentration of the delivered mixture over a longer period of time a pressure regulating device which—in the current invention—is in the embodiment of a pressure valve 30 is provided on one possible embodiment of the invention. By way of the pressure valve an operating pressure is established in the area of the water line 9 and therefore on the inlet side of the throttle aperture 160 and well as in the cartridge itself which is independent from the pressure in the pressure water supply line. This operating pressure is between 1.0 and 3 bar. The aperture of the throttle defines the decrease in pressure and thereby the pressure differential at the nozzle aperture of the cartridge which again establishes the delivered concentration of the spray medium.

In addition the admixing apparatus includes also two threaded pieces 30, 40. A pressure water supply line which is not illustrated here may for example be connected to the threaded piece 30 and for example a spray tube with which the mixture is delivered may be connected to the threaded piece 40.

Figure 1B:
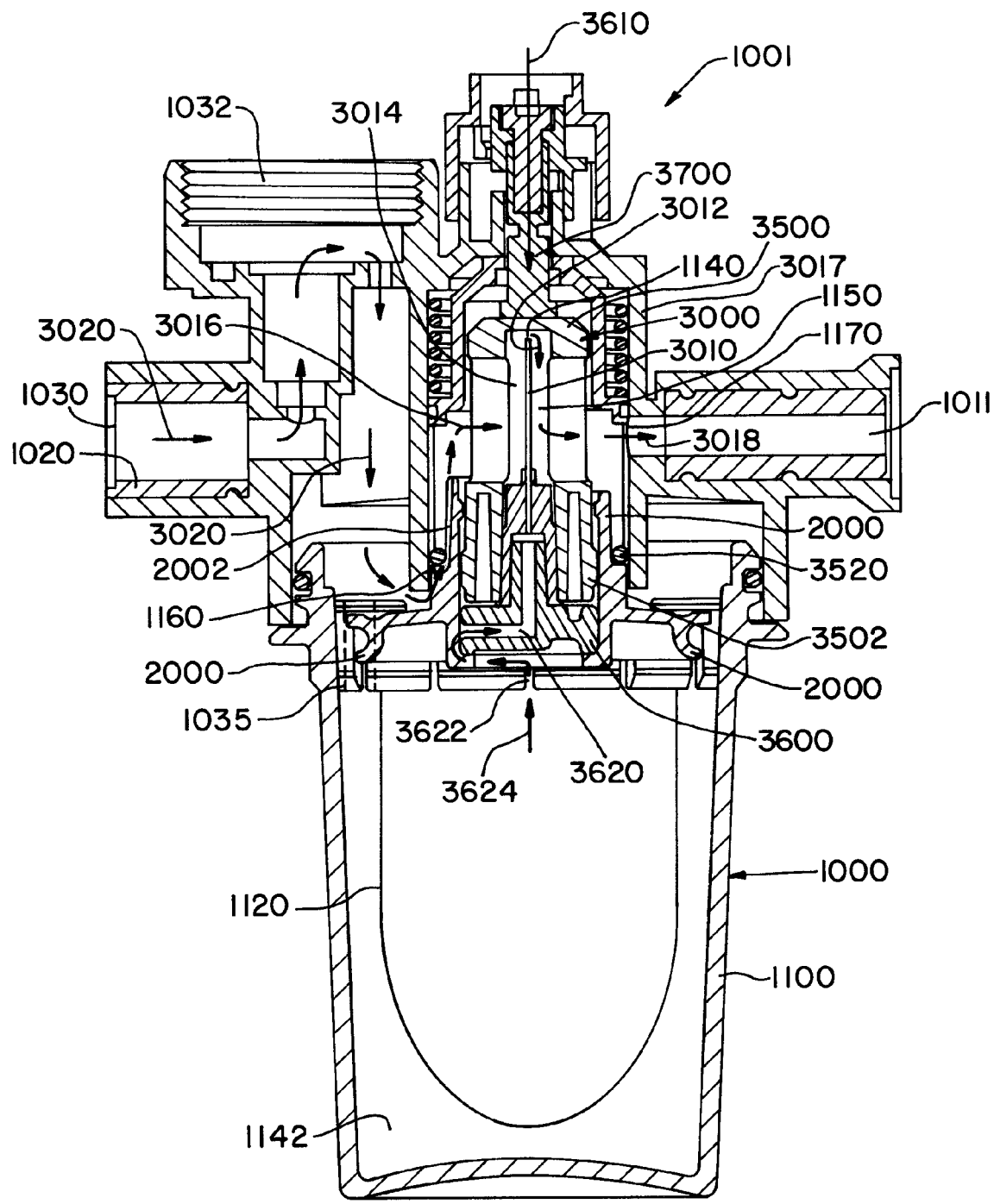
FIGS. 1b-d show a second further developed design variation of a cartridge which is to be installed in an admixing apparatus.
Figure 1C:
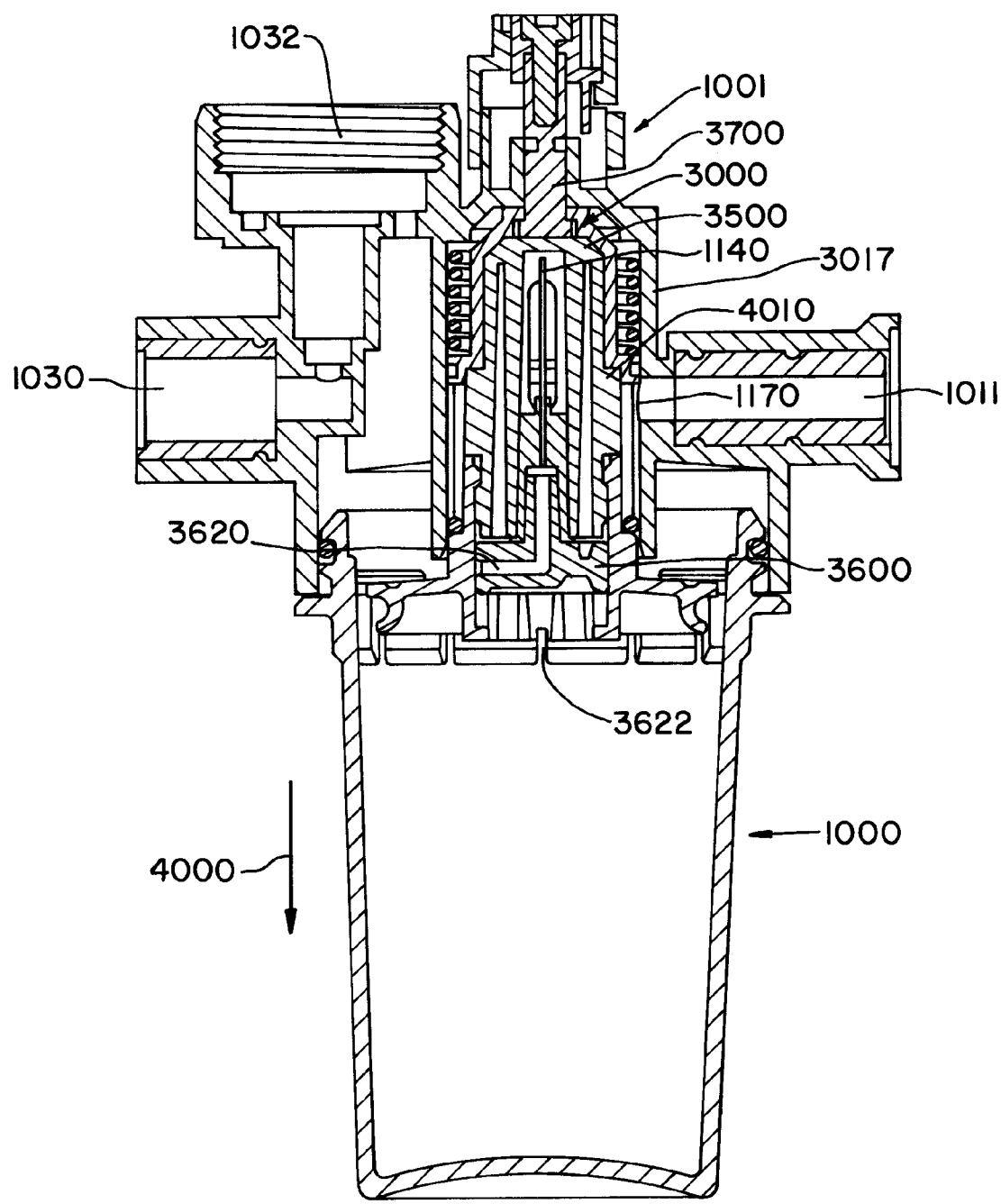
Figure 1D:
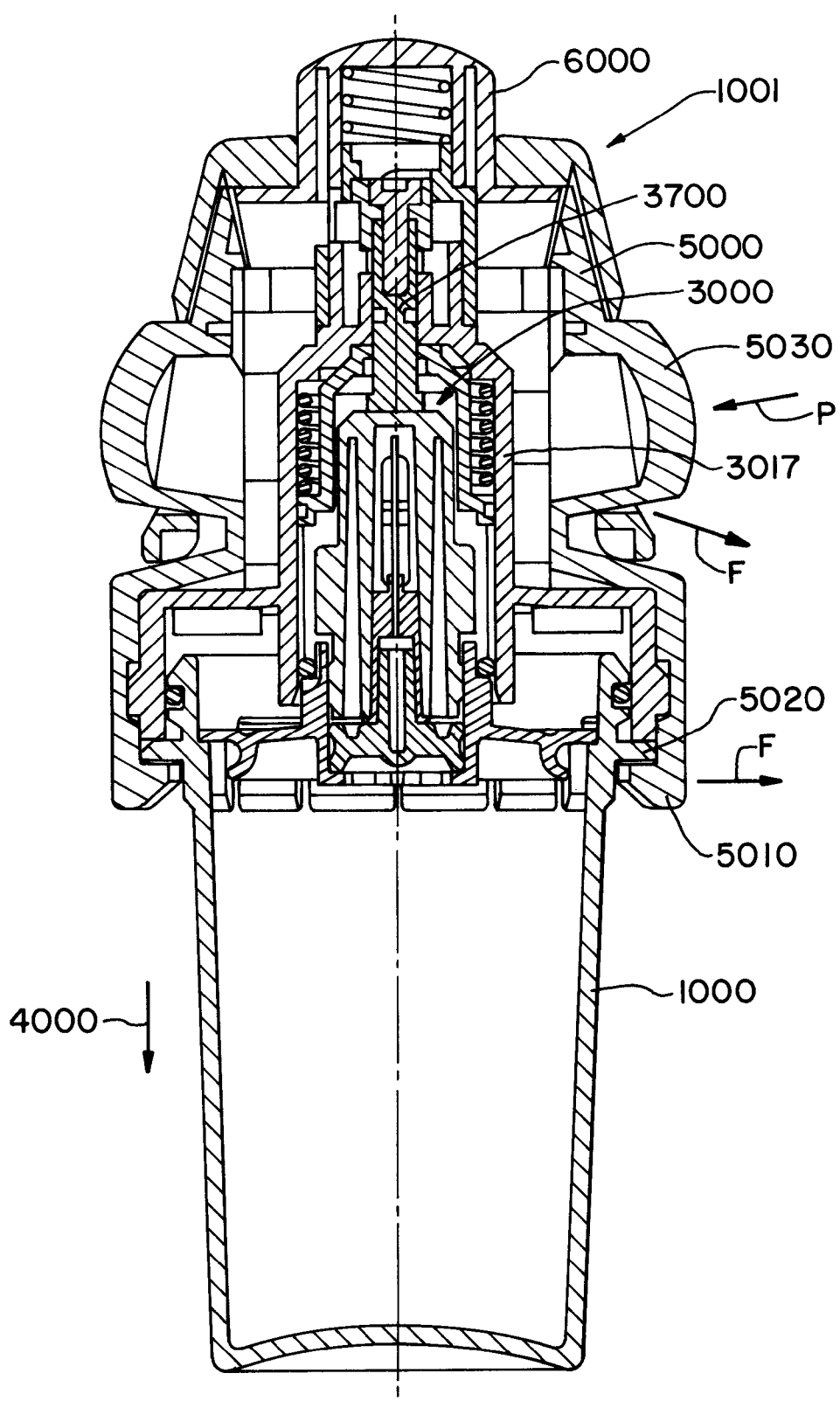

FIGS. 1b-1d illustrate a second design variation of an inventive cartridge which may be installed into an admixing device 1001 which may also be referred to as mixing head.

In contrast to the cartridge illustrated in FIG. 1a the cartridge illustrated in FIGS. 1b through 1d includes a multitude of preferred features. This cartridge consists of two components, a cartridge component 1000 and an activator 3000. The activator is essentially a component that is movable in a wall 3017, including an inlet opening for the solvent as well as an outlet opening 1140 for the concentrate, the mixing chamber 1150 as well as an additional outlet opening for the concentrate/solvent mixture. Components identical to the ones shown in FIG. 1a are identified with reference numbers increased by 1000. In the present design example the outside reservoir of the cartridge component corresponds to the outside housing 1100. As illustrated in FIG. 1a an elastic material interior reservoir 1120 which accommodates a certain concentration of the spray medium is installed inside the outside housing 1100. Admixing device 1001 includes a solvent inlet line with a check valve 1020.

For better control of the metering efficiency the throttle aperture now provides an alternative design, compared to the design form illustrated in FIG. 1a. The throttle aperture identification is 1160 and consists predominantly of milled cuts 2002 in axial direction into an upper closure component 2000 of the cartridge component 1000. The upper closure component 2000 of the cartridge component is connected with a so-called activator 3000. The activator 3000 accommodates a needle 3010 which has an outlet aperture 1140. Spray medium is delivered through the outlet aperture 1140 from the pressurized spray medium reservoir in the cartridge component 1000 into the mixing chamber 1150 as indicated by the arrow 3012. FIG. 1b schematically shows a bore 1035 in broken lines for communicating solvent in the solvent inlet line of admixing device 1001 into space 1142 between outside housing 1100 and reservoir 1120. In the existing example the mixing chamber is configured as an activator which however is allocated to the cartridge and not to the admixing device or the mixing head. Alternatively, the cartridge and activator could also be designed as a single component. From the side of the throttle 1160 pure solvent, in this instant especially water, is supplied to the mixing chamber along the arrows 3016. This mixes in the mixing chamber 1150 with the spray medium that is added along the component 3010. The mixture of water or solvent respectively and spray medium or the chemical substances respectively present in the cartridge penetrates into the line 1011 at an outlet opening along the arrow 3018. The supply of the water occurs through the water inlet opening 1030 along arrow 3020. The pressure regulating device which reduces the pressure in the admixing device or the mixing head to an operating pressure on the input side of the throttle is identified with 1032. As previously mentioned it is advantageous for the invention that the throttle aperture(s) 1160 is (are) milled into the cover 2000 of the cartridge component, progressing in axial direction. The channel diameter and therefore the throttle aperture are defined by the size of the milled cuts. As described previously it is possible to adjust the concentration with which the concentrate or spray medium which is supplied to the water from the side 1030 is admixed into the water by way of selecting the throttle aperture, that is the cross section of the channel which is formed by the milled cuts and the diameter of the nozzle aperture 1140 of the needle 3010. In order to avoid that water flows into the non-mill cut area of the mixing chamber 1150 a seal 3520 is provided in the two-component version of the invention between the cover part 2000 of the cartridge and the axial component 3500.

In order to permit storing that does not create a conductive connection between the reservoir containing the spray medium or concentrate respectively inside the cartridge component 1000 and the nozzle aperture 1140 when the cartridge component 1000 is removed, the current invention provides a component or plunger which is movable in axial direction, on which the needle 3010 is mounted. The plunger 3600 is movable in axial direction inside the wall 3017. The wall 3017 is preferably part of a preferred rotationally symmetrical sleeve in which the also preferred rotationally symmetrical component 3600 can move in axial direction. With the assistance of the component 3500, in this instance the underside 3502, a piston which is allocated to the admixing apparatus or the mixing head 1001 pushes the plunger 3600 downward in direction of the arrow 3610. The piston 3700 acts upon the outside of the component 3500. The plunger 3600 consists preferably of a rubber-elastic material, thereby also fulfilling a seal function. On it's inside a channel 3620 is provided to needle 3010.

Spray medium or concentrate respectively from the spray medium reservoir in the cartridge enters the channel 3620 through the milled cuts 3622 along the arrow 3624. As illustrated in FIG. 1c this conductive connection between the nozzle aperture 1140 and the spray medium reservoir in the cartridge 1000 is released only when the plunger 3600 is held down, as illustrated in FIG. 1b. If the plunger 3600 is in the upper position, as illustrated in FIG. 1c then the plunger seals the inlet through the routings 3622. Spray agent can then not get into the area of the outlet opening 1140 when the cartridge component 1000 is removed. This prevents gumming up or blockage of the outlet opening of the activator or the mixing chamber during storage due to spray medium residue or concentrate residue.

FIG. 1c illustrates a system similar to that in FIG. 1b, whereby however the plunger 3600 is in the "non-operational position" due to the fact that no force through the assistance of the piston 3700 is exerted upon the upper part of the axial component 3500. In the "non-operational position" there is no conductive connection via the mill cuts 3622 in the wall of the cartridge component 1000 with the channel 3620 that is located in the plunger. The cartridge component 1000 is therefore sealed off to the outside. If the activator is constructed as a separate component then this can be stored separately since no conductive connection exists any longer between the outlet 1140 of the mixing chamber 1150 and the interior of the spray medium reservoir. It is then also feasible to provide different activators with different outlet openings 1140 for different concentrates.

The cartridge can be pulled downward in direction of arrow 4000. This is described in detail in FIG. 1d.

In addition it can be seen in FIG. 1c that the axial component 3500 of the activator 3000 is moved by the plunger 3600 into a position where the outlet opening 1170 of the admixing apparatus 1001 is sealed by the ribs 4010 on the axial component 3500. In this way a return flow of the spray medium/water mixture or concentrate/water mixture respectively from line 1011 can be avoided, when the cartridge component with the spray medium is removed in direction 4000.

In the current invention the cartridge component 1000 as well as the activator 3000 are allocated to a component which in short terms is referred to as cartridge and which is preferably constructed of two parts. Alternatively, the cartridge component and the activator may also be designed as a single part component. The allocation of cartridge and activator to a common component results from the fact that the nozzle aperture and the throttle aperture must be selected individually for each spray agent or concentrate respectively in order to ensure optimum metering. The other component is the so-called mixing head or the admixing device 1001. The mixing head includes the pressure valve 1032, the inlet 1030 as well as the outlet 1011 for the mixture and especially the piston 3700 which—when the cartridge component is in use—moves the axial component 3500 of the activator 3000 in axial direction in order to release the spray medium solution. A special embodiment provides that the mixing head is sealed by a cover when the cartridge is removed, so that the unit is operable also if the cartridge component is removed, for example that water may be transported through the opening 1030 from one pressure reservoir into a spray tube 200 which is connected to the outlet opening 1011.

FIG. 1d illustrates further details of the cartridge with the admixing device 1001 which is shown in FIGS. 1b and 1c. FIG. 1d especially illustrates how the cartridge component is connected with the housing of the mixing head and especially how the activator 3000 can be turned into various positions. Components which are identical to those illustrated in FIGS. 1b and 1c are identified with the same reference numbers.

The mixing head housing is identified with reference number 5000. As can be seen clearly the mixing head housing has a protrusion 5010 and the cartridge 1000 a protrusion 5020. If pressure is exerted onto the housing 5000 in the areas of pressure points 5030 in the direction of arrow P then the housing functions as a spring and a force F occurs, causing the protrusion 5010 of the mixing head to move in the direction of arrow P, thereby releasing the cartridge.

In addition the mixing head housing includes an optional turning knob 6000 which translates one rotation into an axial movement in order to move the piston 3700. Through the axial movement of the turning knob 6000 the piston 3700 is moved into a position in which the activator is moved into the operating position as illustrated and also described in FIG. 1b. In other words, the plunger 3600 is moved into the position indicated in FIG. 1b.

If the turning knob is turned into a flushing or a change position the piston is raised and the plunger moved into the position indicated in FIG. 1c. No conductive connection continues to exist between the nozzle aperture 1140 and the spray medium reservoir due to the fact that the plunger 3600 is in the raised position. However, the same as before, water can flow via the throttle aperture 1160 into the mixing chamber 1150 with the cartridge installed, as shown in FIG. 1b. This is advantageous for flushing of the mixing head. All contaminations can be flushed from the mixing head through one rinsing process. The plunger is lifted due to the operating pressure in the spray medium reservoir if no opposing force to hold it down can be exerted by the piston. Following the release of the cartridge component due to pressure load of the mixing housing in the area of the pressure points 5030 the cartridge component may be pulled off in downward direction.

When the cartridge component 1000 is pulled off in downward direction then the outlet opening 1170 of the admixing device 1001 illustrated in FIGS. 1b and 1c is sealed. This prevents a return flow of the spray medium/water mixture from line 1011, if the cartridge component with spray medium is pulled off in direction 4000, as shown in FIG. 1c.

The design variations of a mixing head and a cartridge consisting of cartridge component and activator illustrated in FIGS. 1b through 1d which were improved with numerous additional characteristics compared to design variation 1a allow for storage where contamination of the nozzle cannot occur, since no conductive connection exists in the storage condition between the nozzle aperture and the spray medium reservoir. In addition, the solution in accordance with FIGS. 1b through 1d distinguishes itself in that the throttle apertures are channel openings which permit precise adjustment regarding their diameter size. The outlet openings are in the embodiment of a needle whose diameters are more precisely defined than in the design variations according to FIG. 1a. This permits an exact metered addition as well as a hazard free storage.

This allows especially also rinsing of the mixing chamber prior to storage, in order to flush out spray medium residues.

Figure 1E:
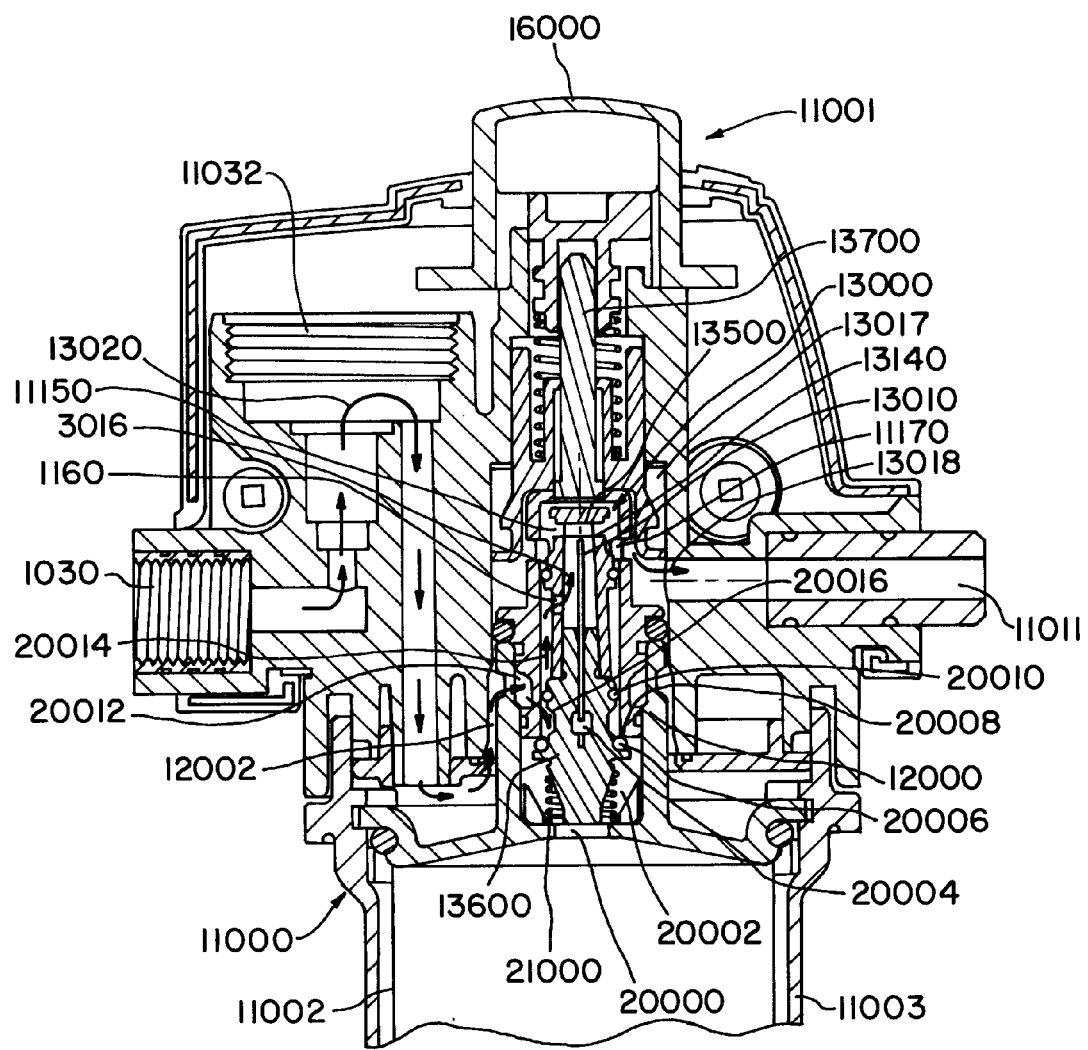

FIGS. 1e through 1g illustrate a third further developed design form of the invention.

Identical components as shown for the design variation according to FIGS. 1b-d are identified with reference numbers increased by 10000.

In contrast to the cartridge illustrated in FIGS. 1b-d the cartridge illustrated in FIGS. 1e-g includes a multitude of additional features. The basic design feature provides that the activator 13000 is designed such that in the activator 13000 position in which penetration of concentrate into the mixing chamber is prevented a conductive connection is provided with which the mixing chamber as well as the needle or hollow needle can be flushed, for example with water.

In the existing design example according to FIGS. 1e-g the exterior container for the cartridge component corresponds with the exterior housing 11100. Inside the exterior housing an interior reservoir 11002, which is constructed of an elastic material and which accommodates a certain concentration of the concentrate, for example, of the spray medium, is installed, as depicted in FIGS. 1f1 and 1g1. By compressing the elastic material the concentrate in the interior reservoir 11002 is delivered through the needle 13010.

As can be seen especially in FIG. 1e the inlet 11162 of water into the activator component of the cartridge component consists in the present example of mill-cuts 12002 in axial direction into an upper closure part 12000 of the cartridge component 11000. In the present example the upper closure part 12000 of the cartridge component is located adjacent to the so-called activator 13000. The activator 13000 accommodates a needle 13010 which is equipped with a discharge opening 13140. If a conductive connection exists between the interior reservoir 11002 and the needle 13010 concentrate or spray medium respectively emerges through the outlet opening 13140 from the pressurized interior reservoir 11002 in the cartridge component 11000 into the mixing chamber 11150. In the example illustrated in FIG. 1e the concentrate or spray agent respectively penetrating through the interior reservoir opening 20000 from the interior reservoir 11002 into the outside chamber 20002 cannot flow to the concentrate inlet opening 20004 of the activator 13000 since the outside chamber 20002 is sealed by a first seal 20006 which may be in the embodiment of an O-ring. Here, the first seal 20006 fits close against a stop 20008. Since the second seal 20010 fits in the center of a water inlet opening 20012 to the activator 13000, the water stream coming through the water inlet opening 20012 is separated into a mixing chamber flushing stream 20014 and a needle flushing stream 20016. In contrast to the design form illustrated in FIGS. 1b through 1d the design form according to FIG. 1e offers the advantage that the mixing chamber 11150 as well as the needle 13010 can be flushed after the system has been taken out of operation, in other words at a time when spray medium or concentrate is no longer mixed with water in the mixing chamber. This ensures that the needle will not conglutinate or gum up during a longer storage period due to concentrate residue.

In the existing example the mixing chamber 11150 is located in the activator 13000 which however is allocated to the cartridge and not to the admixing apparatus or the mixing head 11001 respectively. Alternatively, the cartridge and activator may also be designed as a single component. Pure solvent, in this example especially water is supplied to the mixing chamber through the throttle aperture 11160 along the arrows 13016. As shown in FIGS. 1*g*1 and 1*g*2 in the operating condition said solvent mixes in the mixing chamber 11150 with the concentrate or spray medium supplied through the needle 13140. The mixture of water or solvent, and concentrate or spray agent or the chemical substances inside the cartridge enters into the outlet line 11011 at an outlet opening 11170 along the arrow 13018. The supply of the water occurs through the water inlet opening 11030 along arrow 13020. The pressure regulating device which reduces the pressure in the admixing device or the mixing head to an operating pressure on the input side of the throttle aperture 11160 is identified with 11032. Due to the fact that the size of the throttle aperture 11160 and the size of the nozzle aperture diameter 13140 of the needle 13010 can be selected, it is possible to adjust the concentration at which the spray medium or concentrate which is supplied to the water or solvent through line 11030, as described previously is admixed. Since the throttle aperture 11160 is formed essentially as a bore, the bore can easily be produced for different concentrates or spray mediums, especially also in the required preciseness and at low manufacturing costs. This is an advantage compared to the design variation shown in FIGS. 1*b*-1*d* where the size of the inlet opening for the solvent is determined by the size of the milled cuts 2002.

The adjustment of the activator component 13000 between the non-operational condition (this means no spray medium or concentrate is supplied to the mixing chamber, as shown in FIG. 1*e*) occurs as in the previously discussed design examples 1*b* through 1*d* with the assistance of an axially movable component, for example a plunger 13600 on which the needle 13010 is mounted. Inside the activator component 13000. An outside surface 13500 is located on the upper end of the axially movable component or plunger 13600. In the depicted non-operational condition according to FIG. 1*e*, no force is exerted upon the outside surface 13500 so that the plunger 13600 is in the depicted non-operational condition due to a hydrodynamic restoring force or the restoring force of the spring 21000, thereby permitting flushing of the mixing chamber as well as of the needle. If the axial component of the activator 13000 is to be moved into an operating position as shown in FIGS. 1*g*1 through 1*g*2, then an axially movable piston 13700 presses on the outside surface 13500 of the admixing device or the mixing head 11001.

By way of a turning knob 16000 which is allocated to the admixing apparatus and which translates one rotation into an axial movement of the piston 13700, the piston 13700 is moved either into a position in which the activator is not in it's operating position, as indicated in FIG. 1*e*, or instead acts upon the axially movable component 13600 of the activator thus moving the activator component into the operating position, as shown in FIGS. 1g1 through 1g2.

FIG. 1/1 illustrates the cartridge component 11000 with allocated closure component as well as the activator 13000 located in the closure component for the system illustrated in FIG. 1e. FIG. 1/1 shows this total system whereby the activator is in the spray position from FIG. 1e. As can be seen clearly from FIG. 1/1 the mixing chamber 11150 is located in the activator component 13000 and not in the mixing head depicted in FIG. 1/1.

FIG. 1/1 illustrates the entire system whereby the cartridge component 11000 includes an outside wall 11003 or an exterior housing, as well as in interior reservoir 11002 which is manufactured from an elastic material. The inside 11005 of the interior reservoir accommodates the concentrate or the spray medium. A conductive connection between the inside 11005 of the interior reservoir in which the concentrate is stored and the activator 13000 forms the interior reservoir opening 20000.

The activator component in its non-operational condition as shown in FIG. 1e is shown in detail in FIG. 1/2. Identical components as shown in FIGS. 1e through 1/1 are identified by the same reference numbers.

FIG. 1/2 illustrates in detail the component which is movable in axial direction along arrow 20050 and which is also referred to as plunger 13600. Also clearly seen is a first seal 20006 of the plunger 13600 with which the outside space 20002 of the activator which is connected through the opening 20000 with the inside space of the cartridge component and is therefore conductively connected with the concentrate is sealed. Also visible is the second seal 20010 with which the inflow of the water through the water inlet opening 20012 to the activator can be controlled. If the component is located in the position as illustrated in FIG. 1/2, then the second seal 20010 is located approximately in the center of the water inlet opening 20012. This causes the water which is inflowing in the direction of the arrow 13020 to be separated into two streams—a mixing chamber flushing stream 20014 and a needle flushing stream 20016. The mixing chamber flushing stream 20014 flows through a throttle aperture 11160 into the mixing chamber 11150 and rinses this out. The needle flushing stream 20016 enters the needle 13010 through the needle opening 20004, flows through the needle and discharges again into the mixing chamber 11150. The entire flushing stream discharges from the mixing chamber 11150 through outlet opening 11170. The third seal 20060 seals the space 20062 into which the water flows from the mixing chamber.

In contrast to all previous examples the stream 13020 which is used in the non-operational condition for flushing is separated into two partial streams in the activator component position as illustrated in FIG. 1/2. This makes it possible to also flush the needle 13010 in addition to the mixing chamber, so that no concentrate residue accumulates after use, thereby clogging it which could cause the entire system to fail the next time it is used.

FIGS. 1g1 through 1g2 illustrate the operating position of the third design variation of the invention according to FIGS. 1e through 1g. If the turning knob 16000 illustrated in FIG. 1e is brought into the operating position, the piston (not illustrated), which is allocated to the mixing head, acts upon the surface 13500 of the axially movable plunger or component 13600 of the activator component 13000. Identical components as shown in FIGS. 1e through 1/2 are identified with the same reference numbers. FIG. 1g1 illustrates the entire cartridge including the cartridge component 11000 as well as the activator component 13000.

On the entire system illustrated in FIG. 1g1 it can be especially observed how the opening 20000 and thereby the conductive connection between cartridge's interior reservoir 11002 and the space 20002 into which the concentrate penetrates from the interior reservoir is changed due the shape of the lower end 20090 of the plunger 13600. The effective opening for the passage for the spray medium from the interior reservoir 11002 is merely the opening 20092 due to the lower part 20090 of the plunger 13600.

As explained previously, the optimum concentration can be provided for each individual spray medium by varying the opening for the inflow of solvents, for example water, into the mixing chamber as well as varying the opening 20000 for admission of concentrate into the mixing chamber through the needle 13010. As seen in FIG. 1g1 this is easily possible for the design example of the system depicted in FIGS. 1e through 1g2 in that the diameter D of underside 20090 of the plunger 13600 is being varied to suit the different spray mediums and concentrates. The diameter D of the plunger is always smaller than the diameter of the opening 20000. Due to the difference in the diameter 20000 and diameter D of the plunger 13600 the effective passage opening 20092 is determined according to the concentrate flow from the interior reservoir 11002 into the activator. Different diameters D of the plunger are realized for different media. Therefore, the most effective passage opening 20092 can be adjusted individually for each concentrate The same reference numbers are used again for the same components in FIG. 1g2 as were used in FIGS. 1e-1g1. The component 13600 or the so-called plunger which is axially movable in the activator is moved into the operating position in FIG. 1g2 with the assistance of a plunger (not illustrated) by pressing down onto surface 13500.

As already described in FIG. 1g1 the underside 20090 of the plunger 13600 is thereby moved into the area of the opening 20000 to the cartridge 11000, resulting in an effective opening 20092 which is defined at the lower end by the diameter D of the plunger 13600. Because of the movement of the plunger 13600 the first seal 20006 no longer fits closely against the stop 20008 of the activator 13000. The concentrate flowing through the opening 20092 along arrow 21002 into the space 20002 can travel along arrow 21002 to the needle inlet opening 20004 and from there through the needle 13010 into the mixing chamber 11150 where it mixes with the water which is supplied along arrow 13020. As can be seen clearly from FIG. 1g2 the path of the water through the water inlet opening in the direction of the needle inlet opening 20004 is sealed off by the second seal 20010. The water merely flows in the drawn direction of the arrow through the throttle aperture 11160 into the mixing chamber 11150. Conversely, in the operating position the second seal 20010 prevents mixing of the concentrate flow 21002 with the water outside the mixing chamber 11150.

Figure 1H:
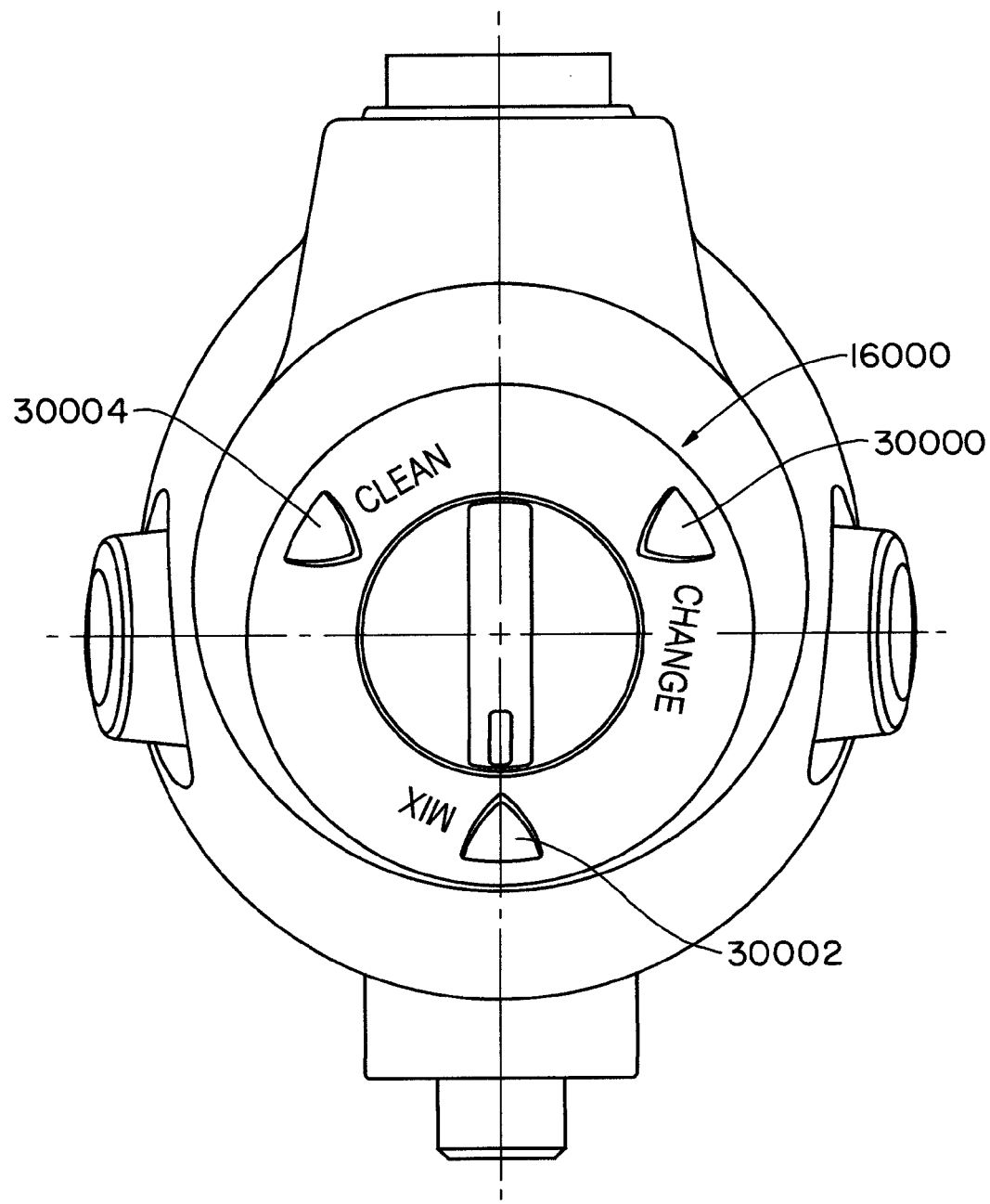
FIG. 1h shows top view of a mixing head housing in the embodiment of a turning knob.
Figure 2:
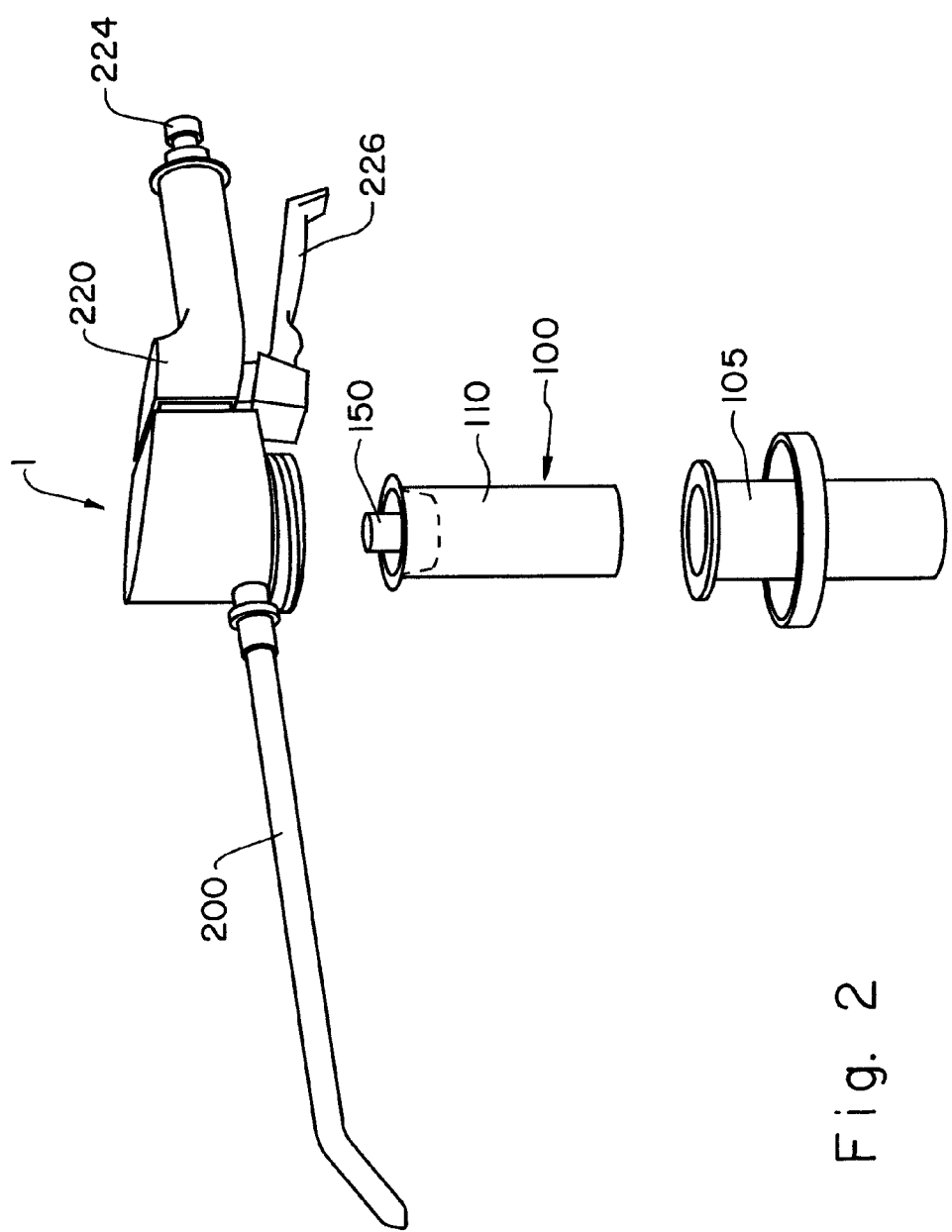
FIG. 2 shows the installation of an inventive admixing apparatus into a manually operable device for spraying of water which is mixed with an additive.

FIG. 1h illustrates a top view of a turning knob 16000 where one rotation of the turning knob 16000 translates into an axial movement of the plunger (not illustrated.) As can be seen from this top view in FIG. 1h, the turning knob has a total of 3 positions. A first position 30000 indicate the position in which the cartridges can be replaced. A second position 30002 indicates the operating condition, the so-called mixing operation where the plunger is moved downward as shown in FIG. 1g2, and the concentrate is mixed with solvent, especially water. A third position 30004 indicates the so-called flushing position, which is shown in FIGS. 1c and 1/2, whereby solvent, especially water, is supplied through the needle as well as the mixing head (FIG. 1/2) or only through the mixing head (FIG. 1c), thereby flushing residue of concentrate from the mixing chamber as well as from the needle.

FIG. 2 illustrates an admixing apparatus representing a manually operable arrangement for spraying water into which an additive in the form of a liquid concentrate, such as a plant protective agent, is mixed. The admixing apparatus 1 is constructed as depicted in FIG. 1a and is positioned between a spray tube 200 and a manual valve 220 with a pressure water connection 224. Also illustrated is the disposable cartridge 100 from FIG. 1.

In the illustrated design variation as depicted in FIG. 1a the disposable cartridge 100 is inserted into an exterior container 105 with the cartridge outside wall 110. As shown, the exterior container can be a screw-in vessel 105 including a thread 5. If the thread 5 is screwed into the thread 3 of the admixing device and if prior to this the cartridge with the outside wall 110 is inserted into the receiving device 105, then the cartridge is admitted with the mixing head 150 into the admixing apparatus so that an emergence of added spray medium is prevented. Instead of the screw-in cartridge, push-in cartridges 1000 or 11000 as illustrated in FIGS. 1b-1h may also be used. Also, when using the push-in cartridges operation is activated only by turning to the mix-operation position, as shown in FIG. 1h.

The disposable cartridge can be set up for various substances. It may specifically include different mixing heads.

The manual valve 220 includes a handle 226 with which the manual valve can be operated. The manual valve 220 is a quick-action stop valve which opens fully when activated by the lever 226 and closes immediately on releasing of the lever 226. The water supply into the admixing device is released through the manual valve 220. The manual valve 220 may be connected either directly to a pressure water line via a pressure water connection, or to a pressure reservoir.

One embodiment of the invention with a pressure reservoir is illustrated in FIG. 3. Same components as in FIGS. 1a-h and 2 are identified with the same reference numbers. In the embodiment according to FIG. 3 the pressure reservoir 300 is illustrated. The pressure in the pressure reservoir is indicated by a pressure gauge 310. The pressure reservoir includes also a manually operated air pump 320 with which the pressure reservoir 300 can be pressurized. The manual valve 220 and therefore also the admixing apparatus 1 is connected to the pressure reservoir 300 via a pressure hose 330 which, in this example represents the pressure water supply line. Even though FIGS. 2 and 3 illustrate an admixing apparatus as illustrated in FIG. 1a, the apparatus according to FIG. 1a may be replaced by the expert with an admixing apparatus as shown in FIGS. 1b-1h without further inventive assistance. The scope of the protection therefore also extends to the admixing devices shown in these FIGS. 1b-1h, in combination with FIGS. 2 and 3.

The current invention for the first time cites a cartridge for an admixing apparatus which can be easily replaced and which especially always ensures optimum admixing of the spray medium contained in the cartridge into an admixing device.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cartridge for connecting with an admixing apparatus for a manually operable device for spraying a solvent into which an additive, in a form of one of a liquid concentrate and a spray medium, has been mixed, said cartridge comprising:
    a cartridge housing of the cartridge;
    a pressure sensitive interior reservoir of the cartridge to accommodate said one of the liquid concentrate and the spray medium; and
    a mixing chamber of the cartridge including a device with a first outlet opening for said one of the liquid concentrate and the spray medium, an inlet opening which is a throttle for the solvent, and a second outlet opening for a mixture of the solvent and said one of the liquid concentrate and the spray medium, said mixing chamber of the cartridge configured for coupling a solvent inlet line of the admixing apparatus with a solvent outlet line of the admixing apparatus that is spaced apart from said solvent inlet line.

2. The cartridge in accordance with claim 1, further comprising an activator component and a cartridge component.

3. The cartridge in accordance with claim 2, further comprising a conductive connection from said interior reservoir to said first outlet opening for said one of the liquid concentrate and the spray medium, said activator component including an axially movable component which selectively releases and closes said conductive connection from said interior reservoir to said first outlet opening for said one of the liquid concentrate and the spray medium.

4. The cartridge in accordance with one of the claim 2, wherein said activator component includes a) one of an axially movable component and a plunger, and b) one of a channel and a second inlet opening for said one of said liquid concentrate and said spray medium from said interior reservoir.

5. The cartridge in accordance with claim 2, wherein said activator component includes said inlet opening for the solvent.

6. The cartridge in accordance with claim 2, wherein said activator component includes a first seal which can be placed into an inlet position in which a conductive connection from said interior reservoir to said mixing chamber is established and a blocking position in which said conductive connection from said interior reservoir to said mixing chamber is interrupted.

7. The cartridge in accordance with claim 2, wherein said activator component includes a water inlet, a second inlet opening for said one of the liquid concentrate and the spray medium from said interior reservoir, and a second seal, said second seal configured for being placed into a mixing position where a conductive connection between said water inlet and said mixing chamber is formed and into a flushing position where a conductive connection between said water inlet and said mixing chamber and between said water inlet and said second inlet opening is formed.

8. The cartridge in accordance with claim 2, wherein said activator component includes a needle.

9. The cartridge in accordance with claim 3, wherein said axially movable component has an outside surface.

10. The cartridge in accordance with claim 2, wherein said mixing chamber is a part of said activator component.

11. The cartridge in accordance with claim 2, wherein said inlet opening is formed by an axially progressing milled cut.

12. The cartridge in accordance with claim 2, wherein said inlet opening is a bore.

13. The cartridge in accordance with claim 1, wherein said inlet opening has a diameter in a range of 1 mm to 3 mm.

14. The cartridge in accordance with claim 1, wherein said first outlet opening has one of a nozzle diameter and a needle diameter which is in a range of 0.1 mm to 2 mm.

15. The cartridge in accordance with claim 1, wherein the cartridge is installed in an exterior container which is connected detachably with the admixing apparatus.

16. The cartridge in accordance with claim 1, wherein said pressure sensitive interior reservoir includes a compressible material.

17. The cartridge in accordance with claim 3, wherein said cartridge component includes a wall which is a part of a sleeve in which said axially movable component moves axially.

18. A manually operable device for spraying a solvent into which an additive, in a form of one of a liquid concentrate and a spray medium, has been mixed, said manually operable device comprising:
   an admixing apparatus including a solvent inlet line and a solvent outlet line spaced apart from said solvent inlet line;
   a cartridge including:
      a cartridge housing;
      a pressure sensitive interior reservoir to accommodate said one of the liquid concentrate and the spray medium; and
      a mixing chamber including a device with a first outlet opening for said one of the liquid concentrate and the spray medium, an inlet opening which is a throttle for the solvent, and a second outlet opening for a mixture of the solvent and said one of the liquid concentrate and the spray medium, said mixing chamber of said cartridge coupling said solvent inlet line with said solvent outlet line.

19. The admixing apparatus in accordance with claim 18, further comprising a piston.

20. The admixing apparatus in accordance with claim 19, wherein said cartridge further includes an axially movable component, said piston moving said axially movable component into at least two positions corresponding respectively to opening and closing a conductive connection to said first outlet opening.

21. The admixing apparatus in accordance with claim 18, wherein the admixing apparatus can be connected detachably with said cartridge.

22. The admixing apparatus in accordance with claim 18, further comprising a pressure regulating unit.

23. The admixing apparatus in accordance with claim 18, further comprising a check valve.

24. The admixing apparatus in accordance with claim 18, wherein said solvent inlet line is a water line with a water line inlet opening and a first and a second water line outlet opening.

25. The admixing apparatus in accordance with claim 18, further comprising a mixture line with a mixture inlet opening and a mixture outlet opening.

26. The admixing apparatus in accordance with claim 24, wherein said water line inlet opening is configured for being connected detachably with a pressure water supply line.

27. The admixing apparatus in accordance with claim 25, wherein said mixture outlet opening is configured for being connected detachably with a spray tube.

28. A manually operable device for spraying a solvent into which an additive, in a form of one of a liquid concentrate and a spray medium, has been mixed, said manually operable apparatus comprising:
   a delivery device;
   a pressure water connection; and
   an admixing apparatus between said delivery device and said pressure water connection, said admixing apparatus including a solvent inlet line and a solvent outlet line spaced apart from said solvent inlet line;
   a cartridge including:
      a cartridge housing;
      a pressure sensitive interior reservoir to accommodate said one of the liquid concentrate and the spray medium; and
      a mixing chamber including a device with a first outlet opening for said one of the liquid concentrate and the spray medium, an inlet opening which is a throttle for the solvent, and a second outlet opening for a mixture of the solvent and said one of the liquid concentrate and the spray medium, said mixing chamber of said cartridge coupling said solvent inlet line with said solvent outlet line.

29. The manually operable device in accordance with claim 28, further comprising a manual valve located between said pressure water connection and said admixing apparatus, said manual valve configured for operating as a fully opening quick-action stop valve.

30. The manually operable device in accordance with claim 28, wherein said pressure water connection is connectible with one of a water main and a portable pressure reservoir.

31. A cartridge for connecting with an admixing apparatus, said cartridge comprising:
   a pressure sensitive interior reservoir of the cartridge to accommodate a liquid concentrate; and
   a mixing chamber of the cartridge including a device with a first outlet opening for said liquid concentrate, an inlet opening for a solvent, and a second outlet opening for a mixture of said liquid concentrate and said solvent, said inlet opening for said solvent having an opening diameter depending upon said liquid concentrate, said opening diameter configured such that said liquid concentrate is optimally discharged, said mixing chamber of the cartridge configured for coupling a solvent inlet line of the admixing apparatus with a solvent outlet line of the admixing apparatus that is spaced apart from said solvent inlet line.

32. A cartridge for connecting with an admixing apparatus, said cartridge comprising:
   a reservoir of the cartridge to accommodate a liquid concentrate; and
   a mixing chamber of the cartridge including a device with a first outlet opening for said liquid concentrate, an inlet opening for a solvent, and a second outlet opening for a mixture of said liquid concentrate and said solvent, said inlet opening for said solvent having an opening diameter depending upon said liquid concentrate, said opening diameter being between approximately 1.2 mm and approximately 3 mm, said mixing chamber of the cartridge configured for coupling a solvent inlet line of the admixing apparatus with a solvent outlet line of the admixing apparatus that is spaced apart from said solvent inlet line.

* * * * *